(12) United States Patent
Callais et al.

(10) Patent No.: US 6,762,263 B2
(45) Date of Patent: Jul. 13, 2004

(54) HIGH-SOLIDS COATINGS RESINS VIA CONTROLLED RADICAL POLYMERIZATION

(75) Inventors: Peter A. Callais, Upper Providence, PA (US); Puvin Pichai, Upper Providence, PA (US); Michael G. Moskal, Lower Pottsgrove, PA (US); Olivier Guerret, Mazerolles (FR)

(73) Assignee: ATOFINA Chemicals, Inc., Philadelphia, PA (US)

( * ) Notice: Subject to any disclaimer, the term of this patent is extended or adjusted under 35 U.S.C. 154(b) by 35 days.

(21) Appl. No.: 10/061,423

(22) Filed: Feb. 1, 2002

(65) Prior Publication Data

US 2003/0149205 A1 Aug. 7, 2003

(51) Int. Cl.$^7$ .................................. C08F 2/00
(52) U.S. Cl. .................... 526/220; 526/219.6; 526/227; 526/317.1; 526/320; 526/329.2; 526/329.5; 526/331; 526/347
(58) Field of Search .............................. 526/219.6, 220, 526/227, 317.1, 320, 329.2, 329.5, 331, 347

(56) References Cited

U.S. PATENT DOCUMENTS

| 4,581,429 A | 4/1986 | Solomon et al. ............ 526/220 |
| 4,777,230 A | 10/1988 | Kamath ........................ 526/86 |
| 5,322,912 A | 6/1994 | Georges et al. ............. 526/204 |
| 5,627,248 A | 5/1997 | Koster et al. ................ 526/217 |
| 6,509,428 B1 * | 1/2003 | Senninger et al. .......... 526/220 |
| 6,569,967 B1 * | 5/2003 | Couturier | |

FOREIGN PATENT DOCUMENTS

| EP | 1 142 913 A | 10/2001 |
| WO | WO 96 24620 A | 8/1996 |
| WO | WO 98/01478 | 1/1998 |
| WO | WO 98/13392 | 4/1998 |
| WO | WO 00/49027 * | 8/2000 |
| WO | WO 00 53640 A | 9/2000 |

OTHER PUBLICATIONS

Benoit et al. J. Am. Chem. Soc., (1999), 121(16), 3904–3920.*
Robin et al. ACS Symposium Series (2000), 768, 334–346.*
Sobek et al. J. Inf. Recording (2000), 25(3–4), 455–463.*
LacroixDesmazes et al. Macromolecules (2001), 34(26), 8866–8871.*
Macromolecules, 28, p. 1721–1723, Kato et al 1995.
JACS, 117, p. 5614–5615, Wang et al 1995.
Chap. 14 of "Controlled Release Polymerization", Benoit et al 1998.
Macromolecules, 26, p. 2987–2988, Georges et al 1993.
Lutz, J–F., et al., "Controlled Free–radical Polymerisation of Styrene", American Chemical Society, vol., 40, No. 2, 1999, pp. 319–320.

* cited by examiner

Primary Examiner—Helen L. Pezzuto
(74) Attorney, Agent, or Firm—William D. Mitchell; Thomas F. Roland

(57) ABSTRACT

Processes for the controlled radical polymerization of acrylic and related polymers to produce improved low VOC coating materials, or powder coating compositions, the novel polymers so produced, the catalyst systems employed, processes for application of the improved coatings, coatings so produced and objects coated on at least one surface with the novel coatings are disclosed.

32 Claims, No Drawings

HIGH-SOLIDS COATINGS RESINS VIA CONTROLLED RADICAL POLYMERIZATION

BACKGROUND OF THE INVENTION

This invention relates to compositions of matter classified in the art of chemistry as low volatile organic compound ("VOC") liquid coating compositions, more specifically to such low VOC liquid coating compositions based on polymers derived from polymerization of acrylic monomers, to processes for their preparation and use, to coatings derived therefrom and to objects coated on at least one surface thereof with such coatings.

Increasingly stringent emissions regulations have increased the need on the part of makers of acrylic lacquers and paints for formulations which provide the desirable characteristics associated with such lacquers and paints but with reduced VOC content. One way to achieve such formulations is to increase the solids content of the formulations while maintaining the viscosity of the paint or lacquer within the range required for application, usually spraying, and thereby reduce the amount of VOCs emitted when a given amount of surface area is coated.

Spray application requires low viscosity. Viscosity is directly related to polydispersity (as this term is further defined hereinafter) and concentration of the resin(s) in the paint or lacquer formulation. In order to maintain low viscosity at high resin solids content, low polydispersity of the resin(s) is necessary.

RELATED ART

U.S. Pat. No. 4,777,230 discloses that t-amyl peroxides and peroxides of similar structure provide polydispersity as low as 2 in solution polymerization of acrylic resins.

Organometallic complexes and thio compounds have been shown to provide controlled polymerization reactions, see Macromolecules, 1995, 28, 1721–3, Kato, et al, J. Am. Chem. Soc., 1995, 117, 5614–5, Wang, et al and WO 98/01478. These procedures require the removal of the residual organometallic complex or thio compound from the product to produce a practically useful material.

Controlled radical polymerizations using TEMPO (2,2,6, 6-tetramethyl-1-piperidinyloxy radical) and analogous compounds as well as their alkoxyamine analogs have been reported to produce desirable properties for vinyl polymerizations. See, for example, U.S. Pat. No. 5,322,912, Macromolecules, 1993, 26, 2987–8, Georges, et al, U.S. Pat. Nos. 4,581,429, 5,627,248 and WO 98/13392. None of these references indicates that this type of polymerization reaction will provide acrylic polymers with the desirable properties found for the products produced by the processes of the present invention. In fact, examination of the data shown, for example, in examples 29 through 31 and comparative example K, shows very little difference for polymerization of the acrylic monomer employed by either the particular controlled radical "initer" used or the organic peroxide.

In Chapter 14 of "Controlled Radical Polymerization", Matyjaszewski, K., Ed. ACS Publication Division and Oxford Univ. Press, ACS Symp. Ser. 685,225, 1998, Benoit, et al, inter alia, describe use of a nitroxyl radical derived from an alkoxyamine of the type comprehended by the present invention to polymerize n-butyl acrylate. The molecular weights reported at complete conversion are too high for high solids coatings applications and no report of the solids content obtainable is given. This paper, therefore gives no hint that this type of material can be used in the processes of the present invention to provide the results discovered by the inventors.

SUMMARY OF THE INVENTION

The invention provides in a first process aspect, a process for the free radical solution polymerization to a level of solids suitable for use as low volatile organic solvent coating compositions while maintaining viscosity suitable for such coating compositions of monomers comprising substituted or unsubstituted acrylic acid, or esters thereof in a solvent suitable for high solids coating application at a monomer concentration sufficient to give the desired polymer concentration which comprises treating said monomers in said solvent with a controlled free radical initiator selected from the group N,N-dialkyl-alkoxyamines having one hydrogen atom on one carbon atom in the a position of one alkyl group attached to the amino nitrogen, N,N-dialkyl-nitroxyl radicals having one hydrogen atom on one carbon atom in the a position of one alkyl group attached to the nitroxyl nitrogen and mixtures thereof.

The tangible embodiments produced by the first process aspect of the invention are solutions containing acrylic polymers having number average molecular weights of less than 20,000, preferably less than 6000 as determined by standard methods well known in the art as set forth hereinafter and a narrow molecular weight distribution, or polydispersity, of less than 2, preferably less than 1.5, as determined by standard methods well known in the art as set forth hereinafter. The reduced molecular weight and narrow polydispersity provide solutions of reduced viscosity allowing for higher solids content at a desired viscosity, thus, providing coating solutions with reduced organic solvent emissions per unit area of surface coated. The lowered viscosity also allows use of polymers with higher molecular weights, if desired, which provides improved physical properties such as hardness and mar resistance. Narrow polydispersity results in fewer monofunctional and nonfunctional chains which also leads to better physical properties. Residual nitroxyl groups attached to the polymer chain are expected to provide light stabilization, thus, providing improved light, particularly ultraviolet (UV) light, resistance and improved weathering properties.

The tangible embodiments are, thus, solutions of acrylic polymers having the inherent applied use characteristics of being suitable for use as lacquers or vehicles for paints for coating applications which have reduced emissions of VOCs while maintaining or exceeding the performance of presently existing analogous lacquers or paints.

The invention also provides in a first composition aspect, a low VOC acrylic based coating composition prepared by the first process aspect of the invention.

The invention further provides in a second process aspect, a process of forming a coating derived from the first composition aspect of the invention to the surface of an object on which said coating is desired which comprises applying a coating composition of the first composition aspect of the invention to said surface and evaporating the solvent from said coating composition.

The invention further provides in a second composition aspect, the coating prepared by the second process aspect of the invention.

The invention still further provides in a third composition aspect, an object having on at least one surface thereof a coating as defined in the second composition aspect of the invention.

One of skill in the art will recognize that the invention also provides as a possible first alternative process variation of the first process aspect of the invention, a process otherwise performed according to the first process aspect of the invention, but with the alternative that the polymer so produced is isolated from the polymer solution produced by the first process aspect of the invention and said isolated polymer may then be further processed by standard methods to, for example, prepare compositions suitable for use in preparing powder coatings.

Thus, the invention provides in a fourth composition aspect a powder coating composition prepared by the above alternative process aspect of the first composition aspect of the invention.

Still further, the invention provides in a fifth composition aspect an object coated on at least one surface thereof with a coating prepared by coating the said at least one surface of the object with the powder coating composition of the fourth composition aspect of the invention and fusing said powder coating composition into a coherent coating.

DETAILED DESCRIPTION

The manner of practicing the processes of the invention to prepare the novel products thereof, the coating and the coated objects prepared from the novel products will now be generally described.

The N,N-dialkyl-alkoxyamines or N,N,-dialkyl-nitroxyls having one hydrogen atom on one carbon atom in the a position of one alkyl group attached to the amino nitrogen are those alkoxyamines or nitroxyls which are encompassed by that generic description and which have a molecular structure providing reasonable stability to the corresponding nitroxyl radicals which may be generated from them. Such alkoxyamine compounds have the general structure II:

Wherein $R_1$, $R_2$, $R_3$, $R_4$ and $R_5$ are independently selected from the group consisting of straight chain alkyl, branched chain alkyl, cyclic alkyl, substituted, or unsubstituted aralkyl and substituted, or unsubstituted aryl groups having from 1 to 50 carbon atoms, with the proviso that one of said R moieties be substituted with, or contain sulfur, phosphorous, or any equivalent hetero atom known to be not inconsistent with the presence of a stable nitroxyl group and any two of $R_1$, $R_2$, $R_3$, $R_4$, and $R_5$ which do not contain sulfur, phosphorous, or any other of the above defined hetero atoms, and which are attached to the same carbon atom, may be concatenated to form, when taken together with the carbon atom to which they are attached, a cyclic alkyl group of from 5 to 20 carbon atoms (other substituents on the R moieties, if present, may be any functional group known in the art not to be incompatible with a nitroxyl function) and Z is as defined hereinbelow.

One of skill in the art will recognize that such alkoxyamine structures (II) are in equilibrium with their corresponding dissociated nitroxyl (Structure I) and Z free radicals, thusly:

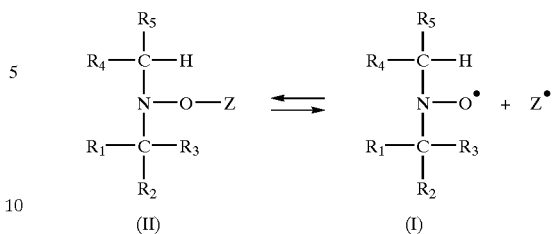

The equilibrium constant for this class of alkoxyamine-nitroxyl equilibrium is a thousand fold higher in nitroxyl concentration as compared to that for nitroxides such as TEMPO. Thus, even very reactive monomers of the acrylate class are controlled in their polymerization while TEMPO is a known inhibitor of acrylate polymerization. See, for example, Tordo, P., et al, ACS Symp. Ser. 1998, 685, p. 225.

Alkoxyamines and nitroxyls (which nitroxyls may also be prepared by known methods separately from the corresponding alkoxyamine) of the above structures are well known in the art. Their synthesis is described, for example in U.S. Pat. No. 6,255,448 and WO 00/40526.

Z in the above alkoxyamine structures and which is liberated from them on heating to form an initiating free radical is selected from the following groups, wherein the dashed line attached to the carbon atom represents either a free electron or the point of attachment to the oxygen atom of the original alkoxyamine as appropriate:

a benzylic radical of the general formula Z1:

wherein $Ar_1$ is an aryl group which may be substituted with halogen atoms, hydroxyl, alkoxy, ester, carboxy, acyl, amino, nitro, cyano, amido, sulfonyl, or phosphonyl groups and where $R_{Z1}$ and $R'_{Z1}$ are independently selected from hydrogen atoms, or cyclic alkyl, straight chain alkyl, or branched chain alkyl groups, of from 1 to 50 carbon atoms and which alkyl groups may be unsubstituted or substituted with any of the above defined substituents for $Ar_1$.

an ester type radical of general formula Z2:

wherein $R_{Z2}$, $R'_{Z2}$ and $R''_{Z2}$ are independently selected from straight chain alkyl, branched chain alkyl, or cyclic alkyl groups of from 1 to 50 carbon atoms which alkyl groups may be unsubstituted or substituted with any of the above defined substituents for $Ar_1$ and $R''_{Z2}$ may also be hydrogen.

a cyano radical of the general formula Z3:

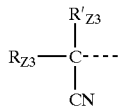
(Z3)

wherein $R_{Z3}$ and $R'_{Z3}$ are independently selected from cyclic alkyl, straight chain alkyl, or branched chain alkyl groups of from 1 to 50 carbon atoms which alkyl groups may be unsubstituted or substituted with any of the named substituent groups for $Ar_1$ and an alkyl radical of the general formula Z4:

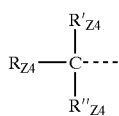
(Z4)

wherein $R_{Z4}$, $R'_{Z4}$ and $R''_{Z4}$ are independently selected from among the alkyl groups as defined for $R_{Z3}$.

It has been established by standard electron spectroscopy resonance ("ESR") that the operating temperature for controlled polymerization through the use of alkoxyamines and their corresponding nitroxyl compounds depends upon the initiation temperature (defined in this instance as the temperature at which the first signal attributable to the presence of the nitroxyl radical is detectable in the ESR spectrum of the solution containing the alkoxyamine) as determined by that technique and operation at about 30° C. above the initiation temperature is adequate to produce a good rate of polymerization, although variations above or below that temperature will be useful depending on the needs of the skilled operator.

For the preferred alkoxyamines contemplated by the present invention, MONAMS-5, methyl 2-[N-t-butyl-N-(1-diethylphosphono-2,2-dimethylpropyl)-N-oxy]propionate, has been found to have an initiation temperature of 75° C., its analog 1-phenyl-1-[N-t-butyl-N-(1-diethylphosphono-2, 2-dimethylpropyl)-N-oxy]ethane has been found to have an initiation temperature of 65° C., its analog 1,1-dimethyl-[N-t-butyl-N-(1-diethylphosphono-2,2-dimethylpropyl)-N-oxy]ethane has been found to have an initiation temperature of 120° C. and its analog 1-methyl-1-cyano-1-[N-t-butyl-N-(1-diethylphosphono-2,2-dimethylpropyl)-N-oxy]ethane has been found to have an initiation temperature of 45° C.

The controlled radical initiators for the polymerization reactions may be formulated in a number of alternative ways.

The first formulation may be a mixture of a nitroxyl free radical and a classical free radical initiator (either an organic peroxide or an azo initiator) at a classical free radical initiator molar ratio to nitroxyl radical of between 0.5 and 2, preferably between 0.8 and 1.25 to 2, with the understanding in mind that both organic peroxides and azo initiators generate two free radicals on decomposition. Preferred nitroxyls include those of formula I wherein $R_1$, $R_2$ and $R_3$ are methyl, $R_4$ is t-butyl and $R_5$ is a group having the structure III:

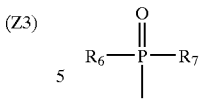
(III)

wherein $R_6$ and $R_7$ are independently selected from the group consisting of straight chain alkyl, branched chain alkyl, or cyclic alkyl groups, aralkyl groups having straight chain alkyl, or branched chain alkyl or cyclic alkyl portions, aryl groups, straight chain alkoxy, branched chain alkoxy, or cyclic alkoxy groups and aralkoxy groups having straight chain alkoxy, branched chain alkoxy, or cyclic alkoxy portions, any of which may be substituted by any functional group known in the art to be compatible with the nitroxyl function. Preferably $R_6$ and $R_7$ are linear alkoxy groups having from 1 to 20 carbon atoms, with ethoxy being the most preferred.

A second formulation may be prepared using the alkoxyamine of structure II by itself or in combination with its corresponding nitroxyl compound of structure I. The molar ratio of nitroxyl to alkoxyamine when the former is present may be from 0.01 to 1.0.

A third alternative formulation comprises a blend of alkoxyamine of structure II in combination with a classical free radical initiator as defined above at a molar ratio of classical initiator to alkoxyamine of 0.5 to 2, preferably between 0.8 to 1.25.

When used herein and in the appended claims the term "group selected from N,N-dialkyl-alkoxyamines having one hydrogen atom on one carbon atom in the a position of one alkyl group attached to the amino nitrogen and nitroxyl radicals generated therefrom" contemplates the optional presence of organic peroxides or azo initiators in any process employing any member of said group.

Polymers suitable for high solids coating applications are prepared by solution polymerization in which select monomers are blended with solvent, a nitroxyl compound, as defined above, optionally with an organic peroxide or azonitrile polymerization initiator, an alkoxyamine alone, or in combination with a nitroxyl compound again optionally with an organic peroxide or azonitrile initiator. One or more conventional chain transfer agents which are well known in the art and not critical to the practice of this invention may also be employed. The reaction mixture so formed is normally heated at a temperature from about 80° to about 200° C. for about 1 to 10 hours. The exact time and temperature for a particular reaction may be selected by a skilled operator to suit the particular ingredients in the reaction mixture and the particular equipment being employed by the use of a few well chosen pilot reaction on an appropriate scale to optimize the result using principles well understood by a skilled polymer chemist.

Low solvent to monomer ratios are used to conduct the polymerization in order to achieve the desired high solids content in the final polymer/solution required for high solids coating applications, typically 25 to 95% solids by weight. The solvent to monomer ratios generally employed are conveniently in the range of from 3:1 to 0.1:1 by weight.

In order to achieve high solids contents solutions with sufficiently low viscosity to be suitable for spray application, the polymer must have the combination of low molecular weight and narrow polydispersity. The normal number-average molecular weight is of the order of 20,000 or less with a polydispersity of 2 or less.

One suitable method of preparing the low molecular weight polymers suitable for high solids coating applications, is a programmed addition of monomers and initiators at a given rate into a polymerization vessel containing a solvent at the desired temperature or at reflux temperature if the temperature and pressure are to be increased using pressure greater than atmospheric once the additions are complete. A second method that may be employed, for the processes contemplated by this invention is to charge the reactor with preformed (using techniques well illustrated in the art) nitroxyl free radical and organic peroxide or azonitrile at the start of the feed period. Alkoxyamine may also be charged alone or in combination with the nitroxyl radical at the start of the reaction. The monomers should be metered at a rate (determined in advance according to principles and using techniques well understood by a polymer chemist) which will minimize termination reactions which are more likely to occur in the absence of monomer. Monomers (alone or in combination with alkoxyamine and/or nitroxyl) are metered into the reaction mixture at a precise rate to achieve the desired rate of conversion of monomers. Addition time is typically over a period of 1 to 12 hours, preferably 2 to 10 hours. Control of the rate of monomer addition reduces build up of specific monomers which may have different reactivity rates with each other and themselves. This known technique reduces compositional drift in the polymer product as the reaction progresses.

Polymerization is normally conducted at temperatures known to be appropriate for the nitroxyl or alkoxyamine selected. The appropriate temperature is one which provides good control over the polymerization while maintaining practically useful polymerization rates. The determination of a suitable temperature is well within the skill of a polymer chemist who could do so with a series of well chosen pilot runs to optimize the process conditions. Typically one of skill in the art would select a solvent or solvent blend with the appropriate reflux temperature to maintain the desired temperature for the reaction. Other equivalent techniques, as appropriate, are well known and can be substituted at the option of the operator. At the beginning of the feed of the reaction ingredients, if the reactor is at ambient temperature, the temperature of the reactor and its contents may be brought up to the desired polymerization reaction temperature, typically over a period of 10 minutes to 1 hour. Alternatively the reactor and any solvent and initiator therein may be heated to the desired temperature initially and then after the reactor temperature has stabilized, monomer feed can be started and continued at the desired rate.

For optimum properties of the coating compositions and the final coatings, it is desirable to have monomer levels of less than 1% by weight of the total solids produced in the reaction. One way to accomplish this is to allow a react out period where polymerization is allowed to continue at the reaction temperature for the time necessary to reach the desired monomer level for a time, typically between 1 and 8 hours. Alternatively, low residual monomers may be achieved by adding initiator(s) ("chaser catalyst") after monomer feed is completed. This invention contemplates the use of tertiary alkyl (having $\geq 5$ carbons in the t-alkyl group) hydroperoxide derivatives as chaser catalysts as this provides reduction of residual monomer levels with minimal adverse effects on molecular weight and polydispersity. Simply increasing the polymerization temperature, which increases polymerization rate, also serves to reduce residual monomers, but this has a tendency to increase polydispersity.

A practically useful high solids coating resin, in addition to having narrow polydispersity and low molecular weight of the polymer, must contain chemically active groups (normally hydroxy, carboxy, or epoxy functional groups) in order to undergo molecular weight buildup (crosslinking) after application during drying and any heating to cure the coating where compounds such as melamines are employed as the curing agents. Polymers suitable for use in high solids coatings formulations normally have a hydroxy content of from about 1 to 10% by weight. To prepare a polymer having such hydroxy content, a sufficient amount of hydroxyalkyl acrylate or hydroxyalkyl substituted acrylate such as hydroxyalkyl methacrylate is used (normally at concentrations of from 5 to 75% by weight of the monomer mixture). Similarly, epoxy-functional monomer, such as glycidyl acrylate or methacrylate may be employed to provide crosslinking sites in the polymer.

Any of the known acrylates and substituted acrylates, such as methacrylic acid, and their esters may be employed as monomers in the polymerization processes and resulting composition and use processes contemplated by the invention.

Examples of hydroxyalkyl acrylates and methacrylates that can be used to prepare polymers suitable for high solids coating applications include: 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, 3-hydroxypropyl methacrylate, 3-hydroxybutyl methacrylate, 4-hydroxybutyl methacrylate and the like.

Examples of alkyl acrylates and substituted acrylates such as alkyl methacrylates that may be used to prepare polymers suitable for high solids coatings applications include: methyl methacrylate, ethyl methacrylate, butyl methacrylate, isobutyl methacrylate, hexyl methacrylate, 2-ethylhexyl methacrylate, lauryl methacrylate, ethyl acrylate, propyl acrylate, isopropyl acrylate, butyl acrylate, isobutyl acrylate, hexyl acrylate, 2-ethylhexyl acrylate, lauryl acrylate and the like.

Other monomers, such as, styrene, para-methyl styrene, acrylic acid, methacrylic acid and/or vinyl acetate can also be incorporated into the polymerization reaction to prepare polymers suitable for high solids coatings applications, for example to control monomer costs and/or to obtain a desired balance of film properties.

Adhesion promoting monomers can also be used in the preparation of polymer suitable for use in high solids coatings applications. Such monomers include iso-octyl acrylate, diethylaminomethyl methacrylate, diethylaminomethyl acrylate, t-butylaminoethyl methacrylate and t-butylaminoethyl acrylate, 3-(2-methylacryloxyethyl)-2,2-spirocyclohexyl oxazolidene and the like.

Examples of solvents which may be employed to prepare polymers suitable for high solids coatings applications include: ethyl benzene, n-butyl acetate, t-butyl acetate, ethyl 3-ethoxypropionate, Aromatic 100 (from Exxon Mobil Corp.), toluene, xylene, ethyl acetate, acetone, methyl ethyl ketone, methyl n-amyl ketone, ethyl alcohol, benzyl alcohol, oxo-hexyl acetate, oxo-heptyl acetate, propylene glycol methyl ether acetate, mineral spirits, and other aliphatic, cycloaliphatic and aromatic hydrocarbons, esters, ethers, ketones and alcohols which are conventionally used in the polymerizations of these types of monomers in general. Commercially, the primary considerations in the selection of a suitable solvent or mixture thereof, other than proper boiling range, are cost, toxicity, flammability, volatility and chain-transfer activity.

One polymer suitable for high solids coatings applications contains the residues derived from (by weight) 60% butyl acrylate, 25% hydroxyethylacrylate, 10% styrene, and 5% acrylic acid. Other useful polymers may include the residues (by weight) of 0 to 50% glycidyl methacrylate, 10 to 60% butyl methacrylate, ethyl acrylate, methyl acrylate or methyl methacrylate, methacrylic acid, hydroxypropyl acrylate, hydroxypropyl methacrylate, acetoacetoxy ethyl acrylate, and/or acetoacetoxy ethyl methacrylate. As stated above, the polymer should have a number average molecular weight (Mn) of about 20,000 or less.

As stated above the first process aspect of this invention provides low molecular weight functional polymers with narrow molecular weight distribution or polydispersity suitable for high solids coatings applications through the use of the above defined nitroxyl and alkoxyamine compounds.

A low molecular weight polymer contemplated by this invention as the term is intended to mean in the specification and the appended claims has a number average molecular weight of 500 to 20,000. A narrow molecular weight distribution (narrow polydispersity) as contemplated by the invention is intended to mean in the specification and the appended claims weight average molecular weight (Mw) to number average molecular weight (Mn) ratio of 1.0 to 2.0.

Molecular weight averages of a discrete distribution can be defined by a well known generalized expression:

$$M = (\Sigma N_i M_i^{\alpha})/(\Sigma N_i M_i^{\alpha-1})$$

where $N_i$ indicates the number of molecules with a molecular weight, $M_i$, and where the parameter a is a weighing factor. Those molecular weight averages that are important in determining polymer properties are the number average Mn ($\alpha=1$), the weight average Mw ($\alpha=2$), the Z average Mz ($\alpha=3$), where Mn<Mw<Mz.

A measure of the breadth of the distribution of molecular weights can be given by the ratios (Mw/Mn) and (Mz/Mn). A high (Mw/Mn) ratio indicates the presence of a low molecular weight tail and a high (Mz/Mn) ratio indicates the presence of a high molecular weight tail in the distribution.

The molecular weight distribution of a polymer is one of its most fundamental characteristics. Flow properties, reactivity, cure characteristics, hardness, strength, and various other mechanical properties are all influenced by the molecular weight distribution (MWD). Also, it is observed that performance-oriented criteria (such as, environmental stress, crack resistance and permeability to gases and liquids) depend heavily on the MWD.

Broad MWD polymers (i.e., high (Mw/Mn) and (Mz/Mn) ratios) are unsuitable for high solids coatings applications. It is desirable for polymers used in high solids coatings applications to possess narrow MWD (i.e., low (Mw/Mn) and (Mz/Mn) ratios).

The primary goal of high solids coating technology is to increase the solids (i.e., polymer) content (i.e., reduce the amount of solvent in the system) while maintaining (or even reducing) the solution viscosity. The solution viscosity is strongly influenced by the MWD of the polymer, particularly the (Mz/Mn) ratio. A narrow MWD polymer (i.e., low (Mz/Mn)) leads to a lower solution viscosity. Thus, a narrow MWD results in VOC compliant coating compositions (i.e., VOC-volatile organic compounds) having low viscosity at high solids, superior sprayability (even with conventional air spray at room temperature) and easier control of film thickness. Alternatively, at a given solution viscosity, higher molecular weights can be achieved, providing improved physical properties, such as, hardness and mar resistance.

Narrow MWD also provides a more homogeneous cross-linked network in the final cure/bake cycle (i.e., improves overall film properties). Narrow MWD results in freedom from non-functional or mono-functional dimers and trimers which compromise resistance properties, cause oven condensation and contribute to sagging.

The polymer molecular weights in this application Mw and Mn were determined by gel permeation chromatography (based on narrow MWD polystyrene calibration).

While molecular weights and MWD of polymers can be measured by many different methods (e.g. vapor phase osmometry, ultracentrifugation, and light scattering), the method used in the practice of this invention is particularly preferred. Gel permeation chromatography (GPC) is the most widely used method within the polymer industry to measure the MWD of polymers. The advantages of using (GPC) for measuring the molecular weights and MWD of polymers are (1) moderate cost, (2) fast analysis time, (3) excellent reproducibility, (4) can be applied to a wide variety of solvents and polymers, (5) can be applied to a wide range of molecular weights and (6) good agreement of results, particularly MWD, with results obtained from other techniques.

One of skill in the art will recognize that the loading order and duration of introduction of the alkoxyamine/nitroxyl initiator system may be altered to provide more efficient polymerization. Similarly the ratio of alkoxy amine and nitroxyl may be varied to provide the best combination of control and conversion. The monomer feed composition may be changed and the monomer feed time may be optimized. The time and temperature profile may be altered to suit the needs of the process. The levels and types of solvents may be altered to improve certain aspects of the process, to modify properties of a given composition or to provide special properties desired by particular end users. All such alterations are well within the skill of the ordinary polymer chemist who will be able to optimize such variations with the use of a few well chosen aliquot pilot experiments.

One of skill in the art will also recognize that standard additives well known in the art may be added to improve color, light and/or weathering stability of the coatings contemplated by the invention.

Since the polymerization system belongs to the class of "living" polymerizations, monomers may be added sequentially to further tailor the properties of the final polymer. The alkoxyamine may also employed be to form a "macroinitiator" by using it to polymerize monomer to incomplete conversion. Stripping off the remaining monomer will leave behind a macroinitiator that is "living" and can be used to initiate further polymerization with other polymers enabling, for example the creation of novel block copolymers.

As stated above one possible variation of the process to prepare low VOC coating solutions described above comprises the removal of the solvent from the solution prepared by the process followed by recovery of the residual polymer and its conversion to powder coating compositions by conventional techniques well known to those in the art who will be familiar with analogous methods of preparing powder coating compositions from presently known low VOC acrylic polymer based coating solution analogs. In some instances one of skill in the art may wish to vary the process as described above by using the process technique to prepare higher molecular weight polymers at the same solvent concentration as presently employed while the lower viscosity permits such molecular weight building while allowing convenient processing of the resulting solution. Such higher molecular weight polymers may in many cases provide superior performance for the powder coating compositions and the coatings prepared from them. Use of the higher molecular weight preparation option, is, of course, optional as successful powder coatings may be prepared by other means well understood in the art. U.S. Pat. No. 5,407,707 and WO98/12268 are illustrative of polymer synthesis and powder coating preparation.

The following examples further illustrate the best mode contemplated by the inventors for the practice of their invention.

EXAMPLE 1

7.34 g of MONAMS-5 and 20 g of ethyl benzene are charged to a 100 ml jacketed stirred glass reactor equipped with a thermocouple, reflux condenser and nitrogen gas sparging line. The reactor is heated to 120° C. while sparging with nitrogen. A mixture of monomers is prepared separately consisting of: 52 g. butyl acrylate, 20 g 2-hydroxyethyl acrylate, 8 g styrene. Once the reactor and contents reach 120° C., monomer mix is pumped continuously into the reactor at a constant rate of 0.22 g/min. such that the reactor feed time is 5 hours. After monomer addition is complete, the polymerization reaction is allowed to continue for an additional 8 hours at the same temperature. The progress of the reaction was monitored by sampling at regular intervals. At the end of the reaction time, the reactor is cooled to ambient temperature; the resin was collected by standard techniques and submitted for residual monomer analysis by gas chromatography (GC) and molecular weight analysis. After one hour post feed, total residual monomer was 9.9% by weight, Mn was 3500 and MWD was 1.2. At the end of the 8 hour period, total residual monomers were 0.4% by weight, Mn was 3900 and MWD was 1.4.

EXAMPLE 2

The initiator, solvent and process conditions are the same as in Example 1 except the monomer feed was the mixture: 44 g butyl acrylate, 8 g butyl methacrylate, 20 g 2-hydroxyethyl acrylate, 8 g styrene. After 8 hours post feed reaction time, total residual monomers were 0.4% by weight, Mn was 3800 and MWD was 1.4.

EXAMPLE 3

The initiator, solvent and monomer charges are identical to Example 1 as are the reaction conditions with the exception that MONAMS-5 is blended directly with the monomer mixture and the total mixture is pumped continuously into the reactor over 5 hours. After 1 hour post feed, Mn was 3800 and MWD was 1.5.

EXAMPLE 4

The initiator, solvent, monomer charges and feed rate are as in Example 1 except the reactor contents are maintained at ambient temperature when monomer feed is begun. At that point reactor heating is begun and 120° C. is reached in 20 minutes. After 1 hour post feed, total residual monomers were 0.4% by weight, Mn was 3800 and MWD was 1.4.

EXAMPLE 5

The initiator, solvent and process conditions are the same as in Example 1 except feed time for the monomer mixture is 2 hours and the monomer mixture consists of:
48 g butyl acrylate, 20 g 2-hydroxyethyl acrylate, 8 g styrene, 4 g acrylic acid. After 1 hour post feed Mn was 4500 and MWD was 1.3.

EXAMPLE 6

The initiator, solvent and process conditions are the same as in Example 5, except LUPEROX® 575 (t-amylperoxy-2-ethyl-hexanoate) is used as the chaser and the monomer mixture consists of: 48 g butyl acrylate, 20 g 2-hydroxyethyl acrylate, 8 g styrene, 4 g iso-octyl acrylate. 0.214 g of LUPEROX 575 was added one hour after the monomer feed was completed. After 5 hours post feed (monomers), total residual monomers were 0.31% by weight, Mn was 3800 and MWD was 1.4.

EXAMPLE 7

The initiator, solvent, and process conditions are the same as in Example 5 except the monomer mixture consists of the following: 52 g butyl acrylate, 8 g styrene, 20 g glycidyl methacrylate. After 8 hours post feed, total residual monomers were 0.6% by weight, Mn was 5500 and MWD was 1.5.

The subject matter which applicants regard as their invention is particularly pointed out and distinctly claimed as follows:

We claim:

1. A process for the controlled free radical solution polymerization to a level of solids suitable for use as low volatile organic solvent coating compositions while maintaining viscosity suitable for such coatings of monomers comprising substituted or unsubstituted acrylic acid, or esters thereof in a solvent suitable for high solids coating application at a monomer concentration sufficient to give the desired polymer concentration which comprises treating said monomers in said solvent with a controlled free radical initiator selected from the group N,N-dialkyl-alkoxyamines having one hydrogen atom on one carbon atom in the α position of one alkyl group attached to the amino nitrogen, nitroxyl radicals having one hydrogen atom on one carbon atom in the α position of one alkyl group attached to the nitroxyl nitrogen and mixtures thereof.

2. A process as defined in claim 1 wherein the alkoxyamine has the structure II:

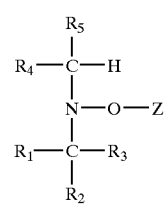

(II)

wherein $R_1$, $R_2$, $R_3$, $R_4$, and $R_5$ are independently selected from the group consisting of straight chain alkyl, branched chain alkyl and cyclic alkyl, substituted, or unsubstituted aralkyl, and substituted or unsubstituted aryl groups having from 1 to 50 carbon atoms, with the proviso that one of said R moieties be substituted with, or contain sulfur, or phosphorous and any two of $R_1$, $R_2$, $R_3$, $R_4$ and $R_5$ which do not contain sulfur, or phosphorous, and which are attached to the same carbon atom, may be concatenated to form, when taken together with the carbon atom to which they are attached, a cyclic alkyl group of from 5 to 20 carbon atoms and Z is selected from the following groups, wherein the dashed line attached to the carbon atom represents either a free electron or the point of attachment to the oxygen atom of the original alkoxyamine as appropriate:

a benzylic radical of the general formula Z1:

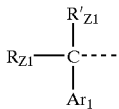
(Z1)

wherein $Ar_1$ is an aryl group which may be substituted with halogen atoms, hydroxyl, alkoxy, ester, carboxy, acyl, amino, nitro, cyano, amido, sulfonyl, or phosphonyl groups and where $R_{Z1}$ and $R'_{Z1}$ are independently selected from hydrogen atoms, or cyclic alkyl, straight chain alkyl, or branched chain alkyl groups, of from 1 to 50 carbon atoms and which alkyl groups may be unsubstituted or substituted with any of the above named substituent groups for $Ar_1$. an ester type radical of general formula Z2:

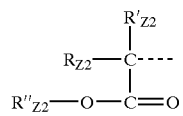
(Z2)

wherein $R_{Z2}$, $R'_{Z2}$ and $R''_{Z2}$ are independently selected from straight chain alkyl, branched chain alkyl or cyclic alkyl groups of from 1 to 50 carbon atoms which alkyl groups may be unsubstituted or substituted with any of the above defined substituents for $Ar_1$ and $R''_{Z2}$ may also be hydrogen, a cyano radical of the general formula Z3:

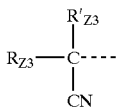
(Z3)

wherein $R_{Z3}$ and $R'_{Z3}$ are independently selected from cyclic alkyl, straight chain alkyl, or branched chain alkyl groups of from 1 to 50 carbon atoms which alkyl groups may be unsubstituted or substituted with any of the named substituent groups for $Ar_1$ and an alkyl radical of the general formula Z4:

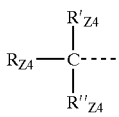
(Z4)

wherein $R_{Z4}$, $R'_{Z4}$ and $R''_{Z4}$ are independently selected from among the alkyl groups as defined for $R_{Z3}$.

3. A process as defined in claim 1 wherein the nitroxyl radical has the structure I:

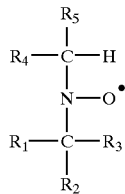
(I)

wherein $R_1$, $R_2$, $R_3$, $R_4$ and $R_5$ are independently selected from the group consisting of straight chain alkyl, branched chain alkyl, cyclic alkyl, substituted, or unsubstituted aralkyl, or substituted, or unsubstituted aryl groups having from 1 to 50 carbon atoms, with the proviso that one of said R moieties be substituted with, or contain sulfur or phosphorous and any two of $R_1$, $R_2$, $R_3$, $R_4$ and $R_5$ which do not contain sulfur, or phosphorous, and which are attached to the same carbon atom, may be concatenated to form, when taken together with the carbon atom to which they are attached, a cyclic alkyl group of from 5 to 20 carbon atoms.

4. A process as defined in claim 1 wherein the controlled free radical initiator is an alkoxyamine selected from the group consisting of methyl 2-[N-t-butyl-N-(1-diethylphosphono-2,2-dimethylpropyl)-N-oxy]propionate, 1-phenyl-1-[N-t-butyl-N-(1-diethylphosphono-2,2-dimethylpropyl)-N-oxy]ethane, 1,1-dimethyl-1-[N-t-butyl-N-(1-diethylphosphono-2,2-dimethylpropyl)-N-oxy]ethane, 1-methyl-1-cyano-1-[N-t-butyl-N-(1-diethyphosphono-2,2-dimethylpropyl)-N-oxy]ethane and mixtures thereof.

5. A process as defined in claim 1 wherein the controlled free radical initiator is the alkoxyamine methyl 2-[N-t-butyl-N-(1-diethylphosphono-2,2-dimethylpropyl)-N-oxy] propionate.

6. A process as defined in claim 1 wherein the controlled free radical initiator comprises a mixture of alkoxyamines as defined in claim 2 and nitroxyl radicals as defined in claim 3.

7. A process as defined in claim 4 wherein the controlled free radical initiator also includes nitroxyls derived from the alkoxyamine selected from the group defined in claim 4.

8. A process as defined in claim 5 wherein the controlled free radical initiator also includes a nitroxyl radical derived from the alkoxyamine.

9. A process as defined in claim 1 also including an organic peroxide initiator or an azonitrile initiator.

10. A process as defined in claim 1 wherein the monomers comprising substituted or unsubstituted acrylic acid or esters thereof are selected from the group consisting of:

(subgroup a) 2-hydroxyethyl acrylate, 2-hydroxypropyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, 3-hydroxypropyl methacrylate, 3-hydroxybutyl methacrylate, 4-hydroxybutyl methacrylate, glycidyl acrylate, glycidyl methacrylate, acetoacetoxy ethyl acrylate, acetoacetoxy ethyl methacrylate and mixtures thereof, (subgroup b) methyl methacrylate, ethyl methacrylate, butyl methacrylate, isobutyl methacrylate, hexyl methacrylate, 2-ethylhexyl methacrylate, lauryl methacrylate, ethyl acrylate, propyl acrylate, isopropyl acrylate, butyl acrylate, lauryl acrylate and mixtures thereof, (subgroup c) acrylic acid, methacrylic acid and mixtures thereof, (subgroup d) iso-octyl acrylate, diethylaminomethyl acrylate, diethylaminomethyl methacrylate, t-butylaminoethyl methacrylate, t-butylaminoethyl acrylate and mixtures thereof, with the proviso that at least one member of subgroup a and of subgroup b must be present.

11. A process as defined in claim 10 wherein a monomer selected from the group styrene, para-methyl styrene, vinyl acetate and mixtures thereof is also present.

12. A process as defined in claim 11 wherein the monomers comprise butyl acrylate, hydroxyethyl acrylate, styrene and acrylic acid.

13. A process as defined in 11 wherein the monomers comprise glycidyl methacrylate, butyl methacrylate, ethyl acrylate, methyl acrylate, methyl methacrylate, methacrylic acid, hydroxypropyl acrylate, hydroxypropyl methacrylate, acetoacetoxy ethyl acrylate, acetoacetoxy ethyl methacrylate and mixtures thereof.

14. The product produced by a process as defined in claim 1.

15. A process for coating an object on at least one surface which comprises applying a product as defined in claim 14 to said at least one surface and treating said product after application on said at least one surface to sufficient heat for a sufficient time to evaporate the solvent contained in said product and crosslink the remaining material of said product on said at least one surface.

16. The coating produced by the process defined in claim 15.

17. The coated object produced by the process defined in claim 15.

18. A process as defined in claim 1 wherein the polymer so produced is recovered as a solvent free material.

19. A powder coating material prepared from the solvent free material prepared as defined in claim 18.

20. An object coated on at least one surface thereof with a coating formed by applying the powder coating material defined in claim 19 to the said at least one surface of said object and fusing said powder coating material into a coherent coating.

21. A process as defined in claim 2 wherein one of $R_1$, $R_2$, $R_3$, $R_4$, or $R_5$ is —P(=O)$R_6R_7$ wherein $R_6$ and $R_7$ are independently selected from the group consisting of methyl, methoxy, ethoxy, n-propoxy, benzyloxy, dodecyloxy, phenyl and benzyl.

22. A process as defined in claim 3 wherein one of $R_1$, $R_2$, $R_3$, $R_4$, or $R_5$ is —P(=O)$R_6R_7$ wherein $R_6$ and $R_7$ are independently selected from the group consisting of methyl, methoxy, ethoxy, n-propoxy, benzyloxy, dodecyloxy, phenyl and benzyl.

23. A process as defined in claim 6 wherein, independently in the alkoxyamine and the nitroxyl, one of $R_1$, $R_2$, $R_3$, $R_4$, or $R_5$ is —P(=O)$R_6R_7$ wherein $R_6$ and $R_7$ are independently selected from the group consisting of methyl, methoxy, ethoxy, n-propoxy, benzyloxy, dodecyloxy, phenyl and benzyl.

24. A process as defined in claim 2 wherein $R_1$, $R_2$ and $R_3$ are methyl, $R_4$ is t-butyl and $R_5$ is —P(=O)$R_6R_7$ wherein $R_6$ and $R_7$ are independently selected from straight chain alkyl, branched chain alkyl, or cyclic alkyl groups, aralkyl groups having straight chain alkyl, branched chain alkyl, or cyclic alkyl portions, straight chain alkoxy, branched chain alkoxy, or cyclic alkoxy groups and aralkoxy groups having straight chain alkoxy, branched chain alkoxy, or cyclic alkoxy portions and all of said groups may be unsubstituted or substituted with any functional group compatible with a nitroxyl radical.

25. A process as defined in claim 24 wherein $R_6$ and $R_7$ are linear alkoxy groups of from 1 to 20 carbon atoms.

26. A process as defined in claim 24 wherein $R_6$ and $R_7$ are ethoxy.

27. A process as defined in claim 3 wherein $R_1$, $R_2$ and $R_3$ are methyl, $R_4$ is t-butyl and $R_5$ is —P(=O)$R_6R_7$ wherein $R_6$ and $R_7$ are independently selected from straight chain alkyl, branched chain alkyl, or cyclic alkyl groups, aralkyl groups having straight chain alkyl, branched chain alkyl, or cyclic alkyl portions, straight chain alkoxy, branched chain alkoxy, or cyclic alkoxy groups and aralkoxy groups having straight chain alkoxy, branched chain alkoxy, or cyclic alkoxy portions and all of said groups may be unsubstituted or substituted with any functional group compatible with a nitroxyl radical.

28. A process as defined in claim 27 wherein $R_6$ and $R_7$ are linear alkoxy groups of from 1 to 20 carbon atoms.

29. A process as defined in claim 27 wherein $R_6$ and $R_7$ are ethoxy.

30. A process as defined in claim 6 wherein $R_1$, $R_2$ and $R_3$ are methyl, $R_4$ is t-butyl and $R_5$ is —P(=O)$R_6R_7$ wherein $R_6$ and $R_7$ in the alkoxyamine and the nitroxyl are each independently selected from straight chain alkyl, branched chain alkyl, or cyclic alkyl groups, aralkyl groups having straight chain alkyl, branched chain alkyl, or cyclic alkyl portions, straight chain alkoxy, branched chain alkoxy, or cyclic alkoxy groups and aralkoxy groups having straight chain alkoxy, branched chain alkoxy, or cyclic alkoxy portions and all of said groups may be unsubstituted or substituted with any functional group compatible with a nitroxyl radical.

31. A process as defined in claim 30 wherein $R_6$ and $R_7$ are linear alkoxy groups of from 1 to 20 carbon atoms.

32. A process as defined in claim 30 wherein $R_6$ and $R_7$ are ethoxy.

* * * * *